United States Patent
Weng (10) Patent No.: US 12,452,610 B2
(45) Date of Patent: Oct. 21, 2025

(54) METHODS FOR SYNTHESIS-BASED CLEAR HEARING UNDER NOISY CONDITIONS

(71) Applicant: Fuliang Weng, Mountain View (JP)

(72) Inventor: Fuliang Weng, Mountain View, CA (US)

(73) Assignee: Fuliang Wang, Mountain View, CA (US)

( * ) Notice: Subject to any disclaimer, the term of this patent is extended or adjusted under 35 U.S.C. 154(b) by 156 days.

(21) Appl. No.: 18/078,919

(22) Filed: Dec. 9, 2022

(65) Prior Publication Data

US 2023/0217194 A1 Jul. 6, 2023

Related U.S. Application Data

(60) Provisional application No. 63/294,848, filed on Dec. 30, 2021.

(51) Int. Cl.
*H04R 25/00* (2006.01)
*G10L 21/0216* (2013.01)

(52) U.S. Cl.
CPC .......... *H04R 25/43* (2013.01); *G10L 21/0216* (2013.01); *H04R 25/507* (2013.01); *G10L 2021/02166* (2013.01); *H04R 2225/43* (2013.01)

(58) Field of Classification Search
None
See application file for complete search history.

(56) References Cited

U.S. PATENT DOCUMENTS

| 11,455,984 B1* | 9/2022 | Haslam ................ G10L 13/033 |
| 2006/0122834 A1* | 6/2006 | Bennett ............... G10L 15/1822 |
| | | 704/E15.047 |
| 2011/0288862 A1* | 11/2011 | Todic ...................... G10L 15/05 |
| | | 704/235 |
| 2017/0243582 A1* | 8/2017 | Menezes ............. G10L 13/0335 |
| 2022/0165250 A1* | 5/2022 | Kang ..................... G10L 25/45 |
| 2023/0290325 A1* | 9/2023 | Akimoto .................. G10G 1/00 |

OTHER PUBLICATIONS

Alex Graves and Navdeep Jaitly, Towards End-to-End Speech Recognition with Recurrent Neural Networks, 32 Proc of Machine Learning Research 1764 (Year: 2014).*

* cited by examiner

*Primary Examiner* — Walter F Briney, III
(74) *Attorney, Agent, or Firm* — Bo-in Lin (57) ABSTRACT

This invention provides a new and improved hearing aid system with high quality noise cancellation method and devices to overcome the limitations and difficulties encountered in conventional technologies. The technical limitations of the noise uncertainty and speech distortion in the hearing aid field are resolved by restoration of the high-quality speech by converting the speech content into an intermediate linguistic representation and by synthesizing the speech of the same speaker with pre-trained using artificial intelligence (AI) modules. In this invention, the noise uncertainties are circumvented by focusing on the target speaker or picking up the dominant speech by choosing the corresponding setting assuming the speech from the target speaker is the dominant speech based on the Lombard effect.

10 Claims, 9 Drawing Sheets

Fig. 1: Synthesis-Based Hearing Aid System Architecture

Fig. 3: System Module Setup

Fig. 4: Noisy Signal Processing Module (box 200)

Fig. 5: Feature Extraction Module (box 300)

Fig. 6: PDL Decoder Module (box 400)

Fig. 7: Mel-Spec Modules (boxes 500, 600)

Fig. 8: Vocoder Module (box 700)

METHODS FOR SYNTHESIS-BASED CLEAR HEARING UNDER NOISY CONDITIONS

TECHNICAL FIELD

This invention relates generally to systems and methods for providing high quality wireless or wired speech communications as well as face to face communication and offline speech signal processing. More particularly, this invention relates to systems and methods for improving the hearing aid technology as well as general speech recovery using artificial intelligence (AI) from both speech recognition and synthesis in dealing with noises from the hearing devices and noisy environments.

BACKGROUND OF THE INVENTION

Various studies have shown that when people get old, their hearing ability is decreasing. On the other hand, the population in most industrialized countries are aging. Therefore, the hearing aid market is growing quickly. However, the hearing aid tech has been lagging even though AI tech has been progressing rapidly in the past decade. Most hearing aid devices amplify the sound volumes while trying to denoise the amplified sound. Unfortunately, the noise types are so diverse and relative to human needs. In some cases, meaningful sounds become noises when people are not interested in attending to them. For example, when two people are talking to each other, the background news broadcasts can be annoying and considered as noises. Therefore, identifying all kinds of noises in all circumstances is not realistic, and we call this ill-defined noise identification problem the noise uncertainty problem.

Instead of focusing on solving the noise uncertainty problem by modeling as many noise types as possible and filtering them out like the existing hearing aid techs, this invention focuses on identifying one or more dominating speech, music, or critical sound sources, recognizing the sounds in a linguistic or note representation, and re-synthesizing and playing them out to the hearer. Based on the Lombard effect, a speaking party would typically raise his/her voices higher than the background so that the conversational partner can hear. Therefore, the assumption that the intended speech, music and/or emergency critical sounds are dominant during conversation is reasonable, and this invention is a valid path to bypass the noise uncertainty problem and help the hearing aid bearer to hear what is intended. As talking in a noisy environment is common and earbuds are so popular, this tech can be used by people beyond the aging and hearing challenged group. Consequently, hearing in use cases, such as conversation in restaurants, can also be a lot easier for common people via a certain setting in this technology.

A typical hearing aid generally includes three basic parts. First, the hearing aid includes a microphone to receive sounds and convert the sound into digital signals. The hearing aid further includes an amplifier to increase the magnitudes of the digital signals, and further includes a speaker to produce the amplified sound for transmitting into a human ear. A more advanced hearing aid may use bone-conduction sound output devices. In general, hearing aids may implement type based noise reduction algorithms with different settings to accommodate different listening environments.

Conventional technologies for hearing aids to improve voice communications are faced with a challenge due to the fact that the amplification of certain frequencies more than others is based on settings of the hearing aids. Furthermore, the noise reductions are carried out by directional microphones to focus on a target speech that may include MEMS microphone arrays typically used with beamforming algorithms. However, speech distortions are generated due to sensitivities changes around the focused main angle when a user of the hearing aids requires a narrow angle for better noise reduction as shown in the polar patterns. There are also noise uncertainty and speech distortion due to the fact that existing technology relies on denoising amplified noisy sounds and the noises are relative to listeners when people talk while common noises are generated from different sources in different situations such as noises on the streets, highways, in-car, dining areas, etc. As noises are generated from many different kinds of sources, the processes for identifying and filtering a particular type of noises are often difficult to achieve and the effectiveness of noise reduction is uncertain.

Conventional technologies for voice communications are faced with a challenge due to the fact that wireless or wired communications, e.g., cellular phone calls, are often carried out in a noisy environment. Common experiences of such phone calls may occur when people are walking on the street, riding in a subway, driving on a noisy highway, eating in a restaurant or attending a party or an entertainment event such as a music festival, etc. Clear communications under those noisy circumstances are often difficult to realize. Therefore, an urgent need still exists in the art of hearing aids to improve voice communications and provide effective and practical methods and devices to cancel noises for daily wireless communications.

In addition to wired or wireless communication. any scenarios related to recovering high quality speech in offline mode, such as noise or distracting signals contaminated recordings, or in online mode, such as video communication and metaverse interaction in noise environments face the same problems as described above.

SUMMARY OF THE INVENTION

The key ideas in this invention are embodied in the specially designed or commonly available earbuds and a computing hub, like a smartphone, or possibly in the cloud when the network connection is excellent. The invention includes the following steps:

1) The algorithm in earbuds collects targeted or dominant sounds such as speech and or music with microphone array tech, such as beamforming algorithms (e.g., MVDR, TD-GSC, neural beamforming) or directional microphones, in real time.
2) The collected noise-reduced intended sounds are passed to the modules in the computing hub that are recognized into per-frame intermediate linguistic and musical representation.
3) The speech from the target conversational partner is also processed to obtain his or her speaker characteristics in terms of speaker embeddings or other speaker identity forms. This retrieval of the speaker characteristics may be achieved via other personal identification means such as face or other non-speech biometric features, or even a pre-stored name. The speaker embeddings are trained offline using the same or similar acoustic conditions as one may receive during the real time use. In case of using the name or non-speech biometric features, an establishment of the link between such non-speech identity and the speaker embeddings need to happen before the conversation.

4) The intermediate per-frame linguistic representation in combination with the speaker characteristics is used to synthesize the speech of the partner speaker in real time. The corresponding close-talk high quality speech of the partner speaker in the same speaker characteristic category is collected and trained for the synthesis.

5) The synthesized close-talk high quality speech is tuned to address specific hearing loss using signal processing tech, such as multi-band frequency compression, based on patients' individual hearing profiles. Timing info from the microphone arrays from the two ears can be used to re-create stereo effects, as well as an acoustic background of much lower energy.

A predefined set of emergency sounds, like siren, will pass to the sound speakers without being blocked for safety reasons. In case of the dominant sound being music in a music hall, a relatively quiet environment, one may repeat the same process as the one for speech. Music can be recognized into notes plus instrument characteristics and incorporated into the intermediate linguistic representation.

After the signals are enhanced, they are sent to various devices placed in different parts of patients' ears based on the levels and causes of their hearing loss.

Therefore, this invention solves the noise uncertainty and speech distortion issues in the hearing aid field. The restoration of high-quality speech is achieved by converting the speech content into an intermediate linguistic representation and synthesizing the speech of the same speaker with pre-trained AI models. In this invention, the noise uncertainty issue is circumvented by focusing on the target speaker or picking up the dominant speech by choosing the corresponding setting. Given the Lombard effect, it is quite possible that the speech from the target speaker is the dominant speech.

Furthermore, the signals denoised by beamforming tech via microphone arrays distort the speech to various extents. This invention uses automatic speech recognition (ASR) tech to train its model on such data with good accuracy and the ASR with the resulting model produces a probabilistic distribution of a linguistic representation (PDL), such as phonetic pieces, phonemes, or graphemes. The next module in the system converts the PDL into Mel-spectrogram with speaker info. As the last conversion is trained offline on clean speech data of high-quality close talk without distortion, the synthesized mel-spectrogram is pleasant to human ears without speech distortion. The system recovers high quality close talk speech without distortion.

For applications beyond earbuds, such as offline noisy stereo recording and online communication in noisy metaverse environments, the same above procedure can be applied to extract, enhance, and recover high quality speech.

As a summary, the invention solves both noise uncertainty and speech distortion issues in the hearing aid field.

DETAILED DESCRIPTION OF THE INVENTION

The present invention will be described based on the preferred embodiments with reference to the accompanying drawings.

Figure 1:
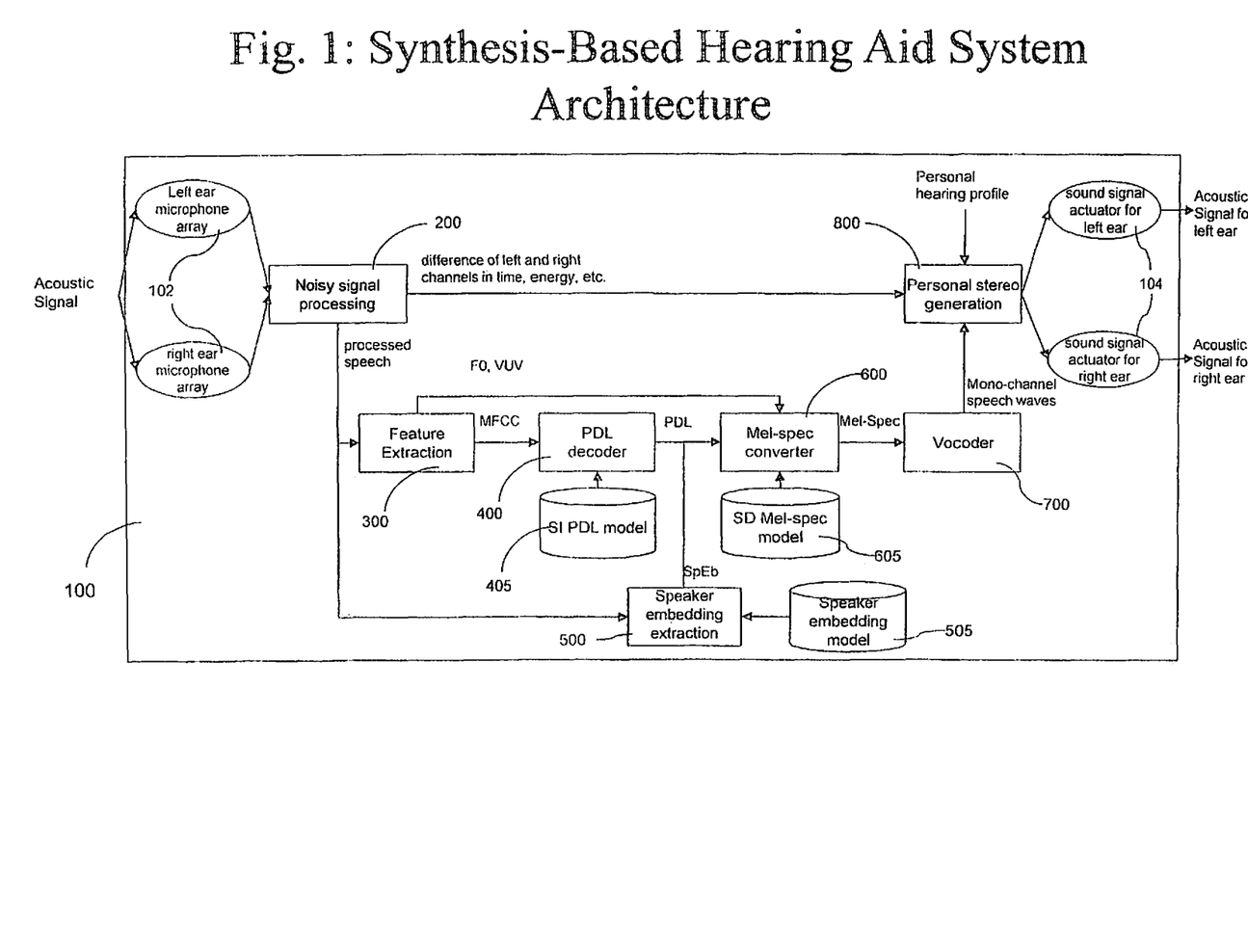
FIG. 1: shows the Synthesis-Based Hearing Aid System Architecture.
Figure 2:
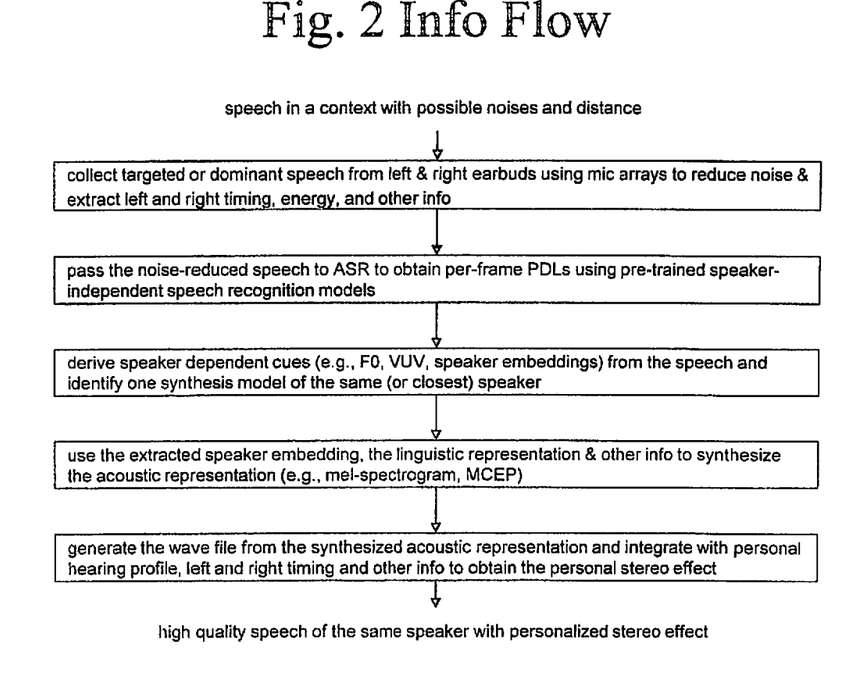
FIG. 2 shows the information flow as that processed in the systems of this invention.

In order to solve the noise uncertainty and speech distortion issues while performing noise reduction in the hearing aid field specifically and multi-channel noise cancellation in general, this invention discloses a system for picking up a targeted speech source(s) (e.g., dominant or specified direction) and the hearer only needs to turn to or specify the target speaker. The overall architecture of the core method is illustrated in FIG. 1 and the major steps are shown in FIG. 2. The detailed descriptions of individual modules are provided below.

As shown in FIG. 1, the module 100 shows an embodiment of the synthesis-based hearing aid system modules and its architecture. When the left and right microphone arrays or channels (module 102) receive acoustic signals, a noisy signal processing module (module 200) processes the streams of signals from the left and right microphone arrays, respectively. The output of the module 200 are passed to three different modules (modules 800, 300, and 500): the timing, energy, and other information are sent to the personal stereo generation module (module 800) for final personalized stereo speech generation, the denoised speech are sent to the feature extraction module (module 300) to obtain necessary features for recognizing the linguistic content in the speech as well as to the speaker embedding extraction module (module 500) to obtain speaker embeddings from the speech. The signals are processed in frames with frame ids for synchronization and real time effect.

In one embodiment, the features extracted by module 300 are Mel-Cepstral Frequency Coefficients (MFCCs) and they are decoded by SI-PDL decoder (module 400) with the model SI-PDL (module 405), where SI stands for speaker-independent and PDL stands for probabilistic distribution of linguistic representation. In the meantime, the enhanced speech signals from module 200 are sent to the speaker embedding extractor (module 500) and the extractor uses a trained model (module 505) to produce the speaker embedding. Other non-speech biometric identity vectors may be used as an alternative to the speaker embedding extractor. which can be translated to the speaker embedding via a machine learning model established offline. The output from module 300, module 400 and module 500 are fed to Mel-spectrogram converter (module 600) using Mel-spec model (module 605). The resulting mel-spectrogram from module 600 gets passed to a vocoder module 700 to obtain mono-channel speech waveforms. The generated waveforms of module 700 are sent to Personal stereo generator (module 800) together with the personal profile, the timing, energy and other information to produce digital personal stereo speech signals which are sent to actuators (module 104). The sound actuators (module 104) can be balanced armature (BA) made speakers that generate acoustic waves for the earbud wearers. A conventional acoustic echo cancellation algorithm can be added to this system to remove echoes from the input channels in case the sound actuators are placed too close to the microphone arrays and the microphones may pick up the sounds from the actuators.

The major processing steps as that shown in FIG. 2 are further described below.

1) The algorithm in earbuds or other devices collects intended speech from multiple channel microphone arrays and algorithms, such as GSC, TD-GSC beamforming or neural beamforming, reduce or remove noises from the collected speech signals in real time. This step may reduce or remove noises by amplifying the signal along the identified direction (DOA) and reducing the signals in the rest directions. In the meantime, the differences in time between the two channels (for example, from the left and right microphone arrays), energy, and others from the two microphone arrays are extracted for generating stereo effect.
2) The captured noise-reduced intended speech is passed to the modules in the computing hub that are recognized into intermediate per-frame PDL representation.
3) The speech from the targeted conversational partner is also processed to obtain speaker-specific representation in the form of speaker embedding, for example. The derived embedding may use multiple frames to increase the robustness and accuracy of the speaker identification, or a vector of interpolated embeddings derived from different sets of frames. The speaker embeddings are trained offline using the same or similar acoustic conditions as one may receive during the real time use. Many speakers in the order of thousands, tens of thousands, or even millions can be used for such training. One may also use non-speech biometric identity to retrieve the speaker embedding of the targeted conversational partner based on their connection established beforehand, typically offline.
4) The per-frame PDL representation in combination with certain reliably recognized speaker characteristics, such as speaker embeddings, F0, and VUV, is used to synthesize mono-channel speech of the speaker in real time.
5) The synthesized speech of high-quality and close talk is tuned to address specific hearing loss using signal processing tech, such as multi-band frequency compression, based on hearer's individual hearing profile. Timing, energy, and other info from the noisy signal processing of the multiple channels, such as the two microphone arrays from the left and right earbuds are used to re-create stereo effects. When necessary, a real-time background sound with a pre-set reduced volume is added to generate a realistic and proper acoustic background.

A predefined set of emergency sounds, like siren, can be passed to the sound speakers without being blocked for safety reasons. In case of the dominant sound being music or singing, one may repeat the same process as the one for speech. Music can be recognized into notes plus instrument characteristics and incorporated into the intermediate linguistic representation.

Figure 3:
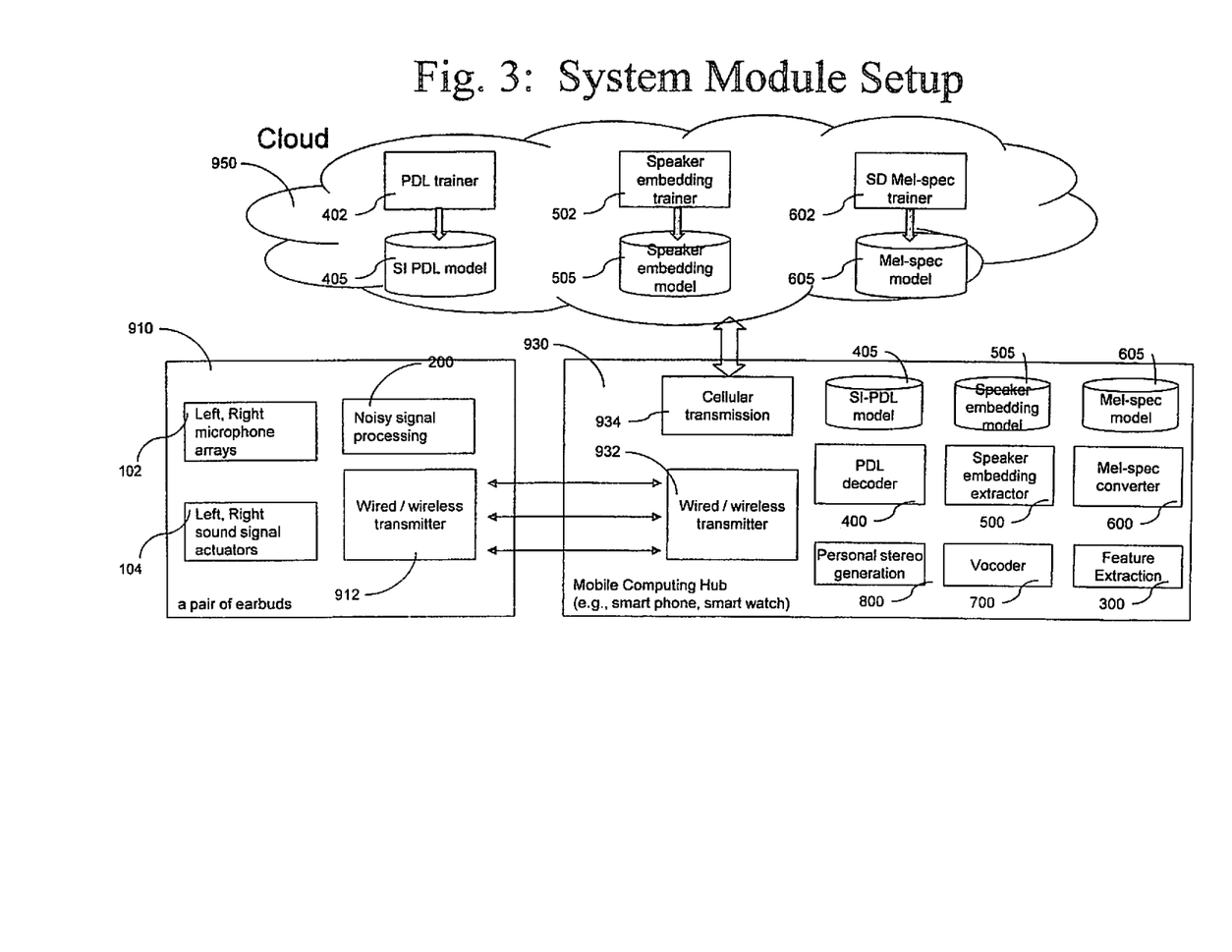
FIG. 3 shows the system module architecture as implemented in this invention.

The FIG. 3 describes an embodiment of the system setup of the synthesis-based hearing recovery. It contains three major components: the earbuds, the mobile computing hub, and the cloud computing. These components host the modules included in module 100 of FIG. 1.

The component module 910 of a pair of earbuds, each earbud contains a microphone array (module 102), a noisy signal processing module, i.e., module 200, a sound speaker or actuator (module 104), and a wired or wireless transmission module (module 912). The enhanced speech signals and other info from the noisy signal processing get passed to the computing hub component 930.

The component module 930 of the mobile computing hub is typically a smartphone, a smart watch, or other device a person can easily carry. The component contains the wired or wireless transmitter (module 932) to send and receive signals from module 910, and exchange with cloud server module 950 via cellular module 934. The features are extracted by module 300 from the received signals and are decoded by SI-PDL decoder (module 400) with the SI-PDL model (module 405). In the meantime, the enhanced speech signals are sent to the speaker embedding extractor (module 500) and the extractor uses a trained model (module 505) to produce the speaker embedding. Other non-speech biometric identity vectors may be used as an alternative to the speaker embedding extractor, which can he translated to the speaker embedding via a machine learning model established beforehand, typically offline. The output from module 300, module 400 and module 500 are fed to Mel-spectrogram converter (module 600) using Mel-spec model (module 605). The resulting mel-spectrogram from module 600 gets passed to a vocoder module 700. The generated mono-channel waveforms of module 700 are sent to Personal stereo generation (module 800) together with the personal profile, the timing, energy and other information to produce digital personal stereo speech signals which are sent to actuators (module 104) in the respective earbuds via wired/wireless transmitters module 932 and module 912. The sound actuators, bone-conduction speaker, or other speakers (module 104) generate acoustic waves for the earbud wearers.

Some modules in module 930 can be relocated to module 910 or module 950 depending on the device manufacturer requirements and computing resources placed in the respective components.

The component module 950 is mainly used to perform offline training of the heavy-duty models. This includes the PDL trainer (module 402) producing the speaker independent ASR model (module 405) given transcribed speech data of many speakers, and the Mel-spectrogram trainer (module 602) producing a speaker-dependent mel-spec model (module 605) with many pairs of input being PDLs and speaker dependent information such as F0, embedding and output being SD-mel-spectrograms aligned per frame from the same speakers. Speaker embedding trainer (module 502) trains a speaker embedding extractor model (module 505) using speech from many speakers in the order of thousands, tells of thousands, or even millions. In real time use, a speaker embedding is extracted by the speaker extractor module (module 500) given multiple frames of the input speech and trained embedding model or a vector of interpolated embeddings derived from different sets of frames (module 505). If any non-speech biometric identity or even personal name is used for the conversational partner, one may establish non-speech biometric identity with the speaker embedding of the targeted conversational partner after the speaker embedding model is trained.

Figure 4:
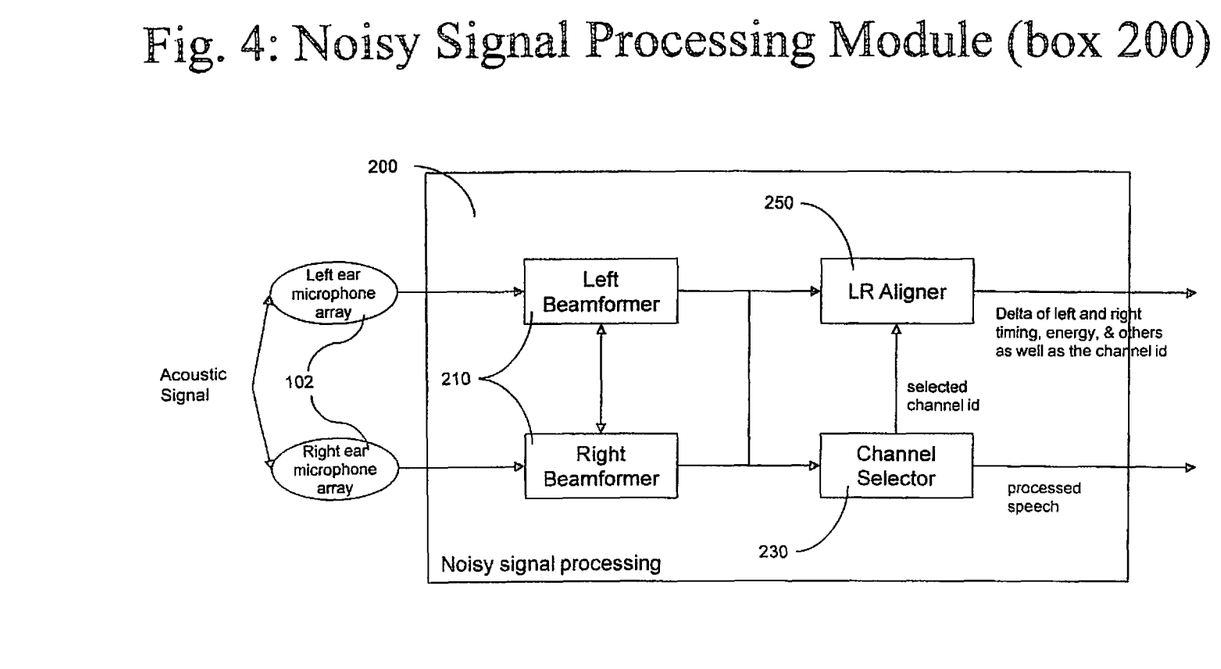
FIG. 4 shows the Noisy Signal Processing Module as that illustrated in module 200 of FIG. 3.

FIG. 4 describes an embodiment of a noisy signal processing module (module 200). It takes the signals from the left and right microphone arrays or channels (module 102), and the identical left and right beamformers (module 210) use one of the high performance beamforming algorithms, such as Minimum Variance Distortionless Response (MVDR), Linear Constrained Minimum Variance (LCMV), Adaptive Generalized Sidelobe Canceller, or Neural mask-based beamforming.

The direction of arrival (DOA) estimated by two beamformers can be used to select the channel so to pass down its signal to the next stage, and the channel selection is performed by module 230. The channel selection (module 230) outputs the processed speech of the selected channel (left or right) that has higher reliability of DOA estimation in combination with SNR estimation from the two channels, and also sends the selected channel id via module 250 to later stage processing.

In one embodiment of module 250, the signals from the left and right microphone arrays are aligned to estimate their differences in timing, energy and other information. The estimation may use dynamic time warping (DTW) or other alignment algorithms. The per frame differences of such info between the left and right signals (for timing, it is represented as the delta of the time marks of the aligned left and right frames) is passed to the stereo generation module. A windowed averaging may be used to smooth any sudden fluctuations in the difference sequence for a nice hearing effect.

Figure 5:
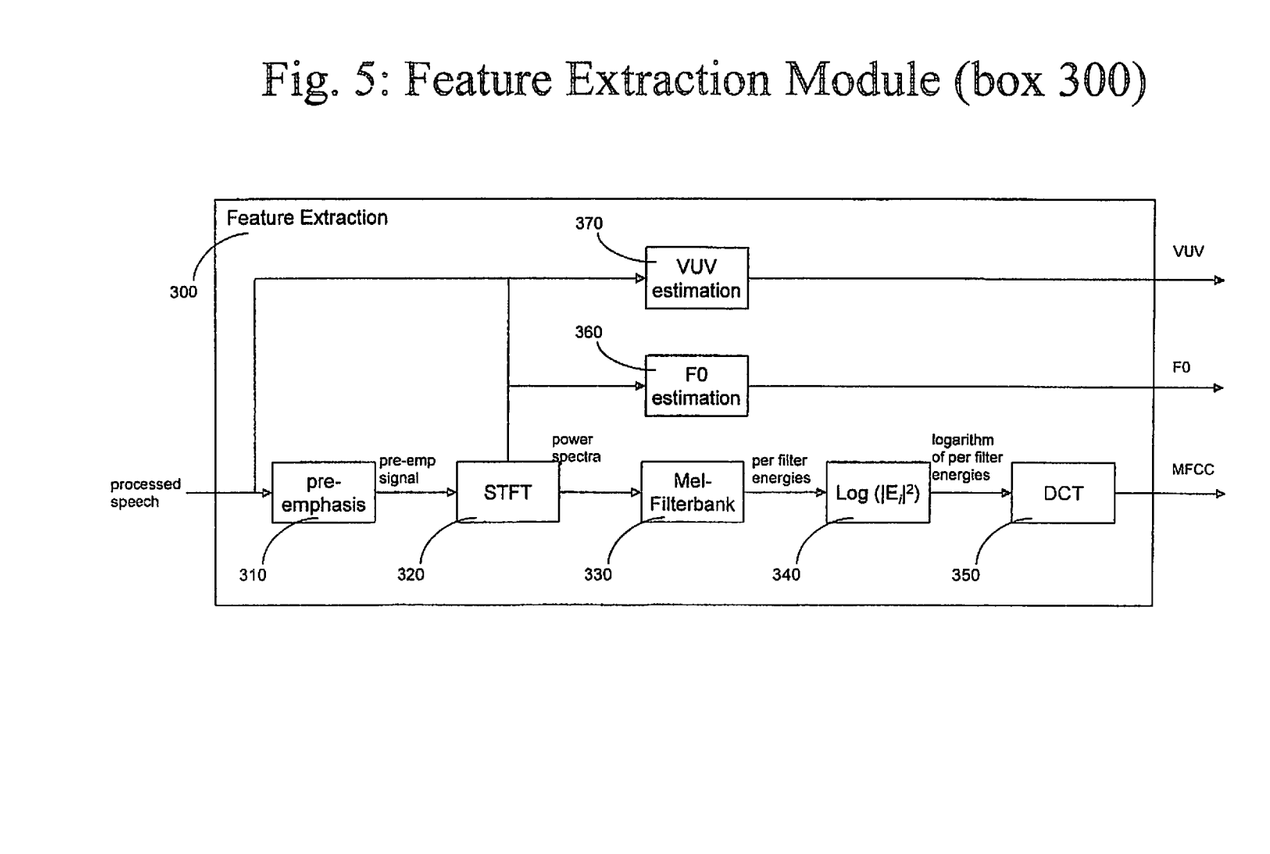
FIG. 5 shows the processing steps of Feature Extraction Module as that illustrated in module 300 of FIG. 3.

The module 300 as that shown in FIG. 5 describes an embodiment of the feature extraction module. It takes the processed speech signals from module 200, and calculates a set of important features for the later stage processing, including Mel-Frequency Cepstral Coefficients, F0 (fundamental frequency), and voiced and unvoiced (VUV) region detection. The results are given per frame.

In one embodiment (FIG. 5), the processed speech signals from module 200 are first pre-emphasized in module 310 to give the signals an emphasis on higher frequencies. This is often performed by using a time domain FIR filter. The resulting speech signals are passed to a short time further transform (STFT) module (module 320) to obtain power spectra frame by frame.

The module 330 applies mel-frequency filters to the power spectra, and the energy $|E_i|2$ is the weighted sum based on each filter i. The next step module 340 takes the logarithm of all the filter-bank energies, and passes them to module 350. As an inverse transformation, module 350 takes discrete cosine transform (DCT) to obtain the coefficients. Typically, only 2-13 coefficients are retained as the MFCCs to be used for speech recognition. In addition to MFCCs, the delta and delta-delta of MFCC features (calculated using adjacent frames) are used as the dynamic features.

Another important feature F0 is estimated in module 360, which in one embodiment takes the output of power spectra from module 320 and identifies approximate harmonic peaks and averages them out to have a more reliable estimate. In another embodiment, one may calculate the averaged distance between consecutive peaks as an estimate.

In one embodiment, the voiced and unvoiced module (module 370) calculates the zero-crossing rate (ZCR) from the processed signals as well as the per frame energy from module 320 to make a choice. If ZCR is low and energy is high, it is classified as voiced speech, otherwise, it is classified as unvoiced speech. When both values are around the threshold (unsure), it is classified as unsure. In another embodiment, the per frame energy calculated by module 320 may use the processed signal directly without the pre-emp module 310 to avoid issues for certain phonemes.

Figure 6:
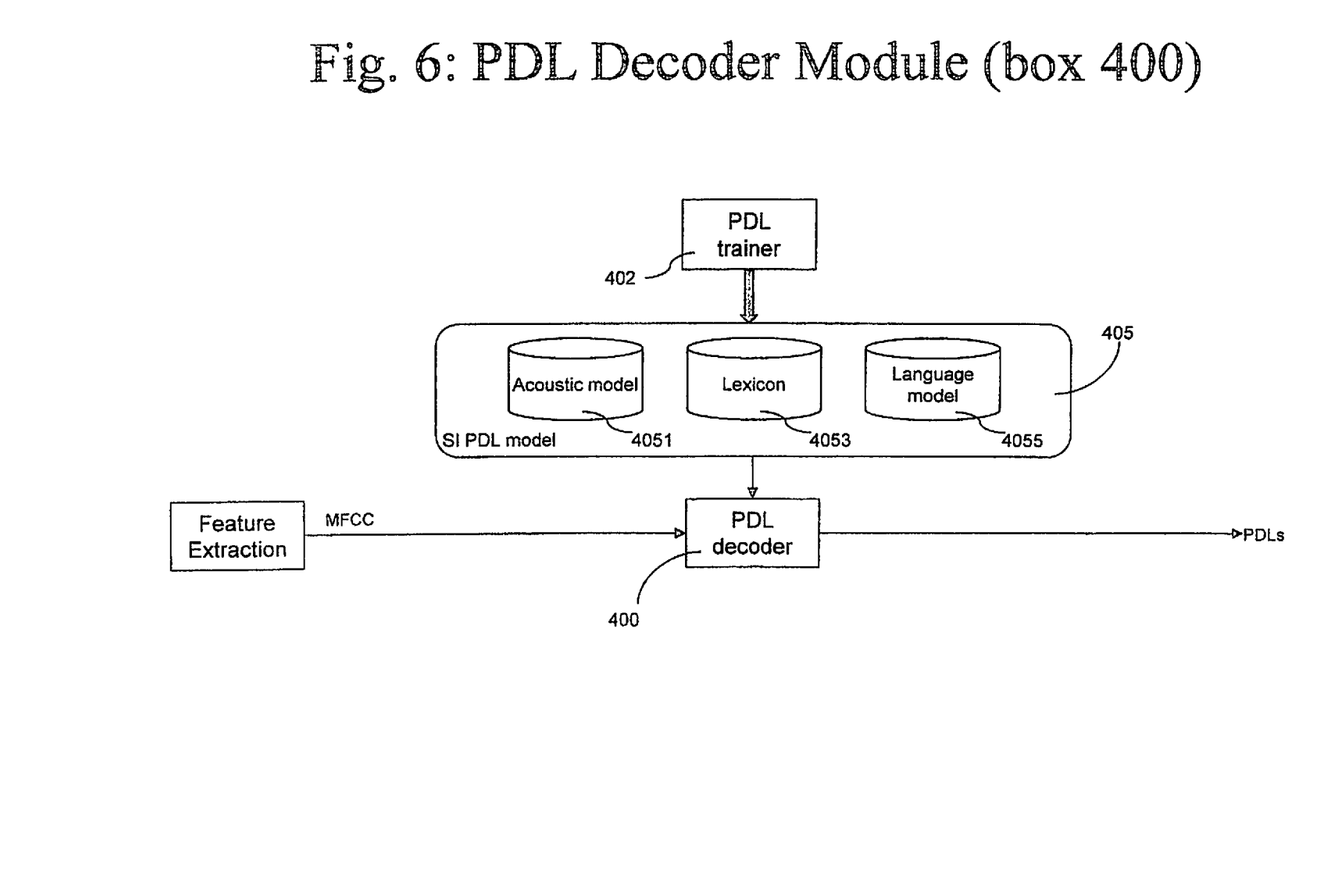
FIG. 6 shows the processing steps of PDL Decoder Module as that illustrated in module 400 of FIG. 3.

The module 400 as that shown in FIG. 6 describes an embodiment of the speech recognition module, using a model module 405 trained by the trainer module 402 typically in the cloud as illustrated in module 950.

In one embodiment of the PDL Decoder module 400 is a decoder that makes use of sub-models in model 405, including the acoustic model module 4051, lexicon (module 4053), and language model (module 4055). The acoustic model module 4051 enables the conversion from the MFCC features into phoneme states of various kinds. The lexicon (module 4053) describes pronunciations of all the words recognizable by the decoder. The language model (module 4055) provides the probabilistic relationship among recognizable words. The three sub-models may be composed into one single network which the decoder, i.e., module 400, can use to find the most likely word sequences, in the meantime, produce PDL representation, and the linguistic units may be phonemes, phonetic pieces, or graphemes. In some embodiments, the PDL decoder module 400 can use only the acoustic model module 4051 and the lexicon module 4053 without the language model module 4055.

In another embodiment, module 400 may adopt end-to-end speech recognition modeling that takes input signal directly without going through explicit feature extraction module 300 and produces PDL output. The PDL model (module 405) is trained using a corresponding trainer in module 402. Examples of such neural network models include transformer, bidirectional LSTM, conformer, RNN-t, etc.

When the size of the linguistic units such as phonetic pieces, phonemes, or graphemes, is large, training a mapping from PDLs to Mel-spectrogram requires a large amount of data. In most cases when speaking, only a few linguistic units have a significant probability mass in a frame. A compressed PDL representation would reduce the amount of neural network parameters to be trained and lead to much higher robustness. In one embodiment, a compression of PDL can use the units with the top n highest probability masses together with a distribution shape indicator, such as entropy. The top n units also have their unit ids associated in the compression. $[[0\ E]\ [i_1\ p_1]\ [i_2\ p_2] \ldots [i_n\ p_n]]$, where E is the entropy of the distribution, $i_1, i_2, \ldots, i_n$ are the indices of the linguistic units with the top n probability masses of $p_2 \ldots p_n$, respectively. A compressed PDL representation may also be realized by using encoder and decoder models.

Figure 7:
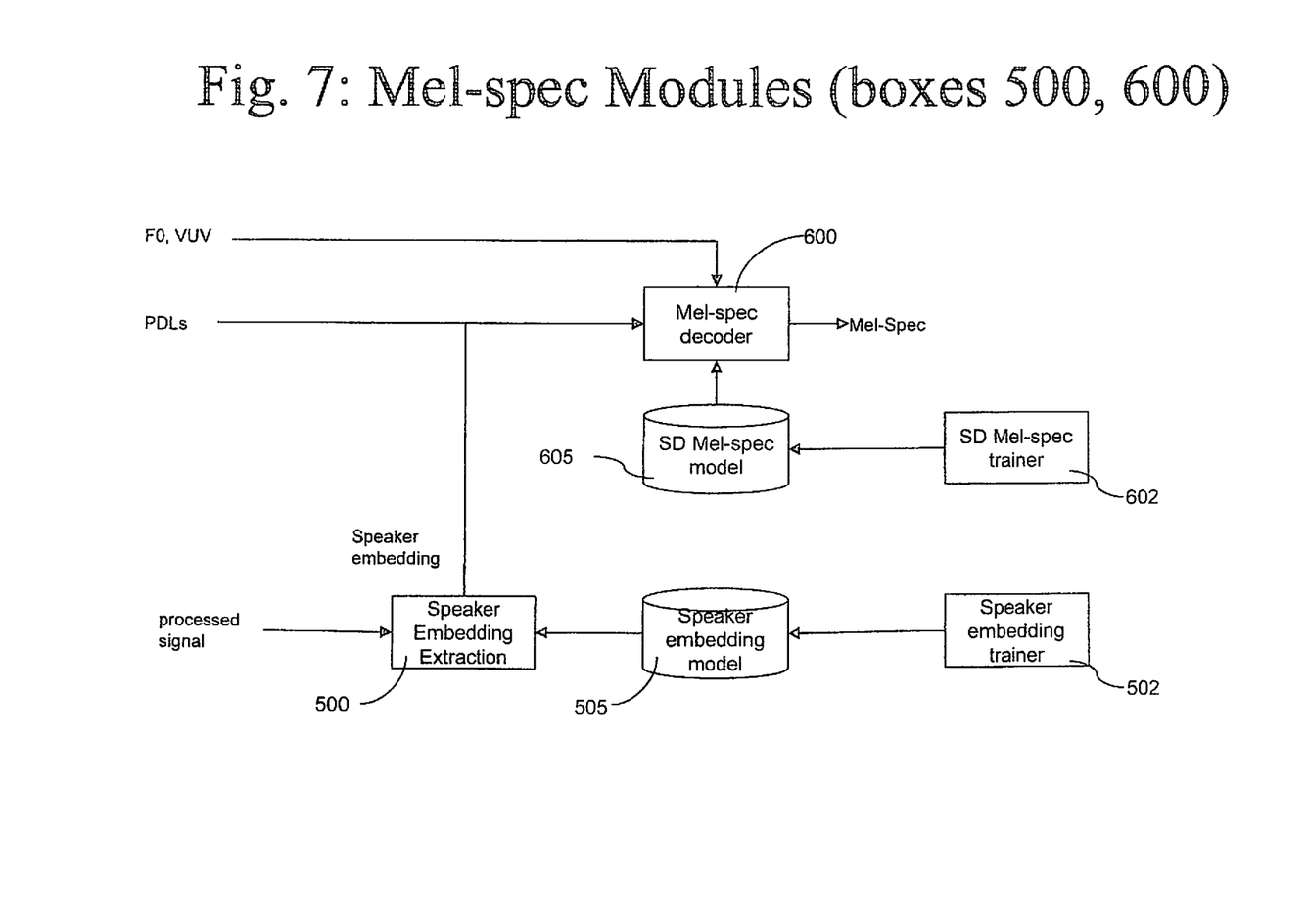
FIG. 7 shows the processing steps of Mel-spec Modules as that illustrated in modules 500, 600 of FIG. 3.

The module 500 as that shown in FIG. 7 describes an embodiment of the speaker embedding extraction module, using a model module 505 trained by the trainer module 502 offline in the cloud as illustrated in module 950.

The model module 505 shown data that is processed and trained by trainer module 502 using speech data from many speakers and each speaker with sufficient amount of their speech for reliable embeddings. The speech data contains the speech data pre-processed via beamforming steps in module 200 so that speakers are properly characterized in the embedding. The speech data before pre-processing may contain speech of different SNR. The model can be various deep neural networks, including CNN or deep residual CNN, (stacked) gated recurrent unit (GRU), etc.

The module 500 extracts the speaker embedding from the processed speech data and passes it to module 600, together with the PDLs, F0, and VUV from the other modules (module 300 and module 400). The input to module 600 are per-frames. Module 600 uses the per-frame information and decodes into Mel-spectrogram based on the pre-trained model module 605.

The model module 605 is trained using paired per-frame speech data of input X and output Y, where X includes speaker embedding, PDLs, F0, and VUV derived using modules 300, 400, and 500 from speech data pre-processed by module 200, and Y is the high quality close talk mel-spectrogram of the same speech. The speech training data contain a diverse set of many speakers in the order of thousands as used in many experiments.

Figure 8:
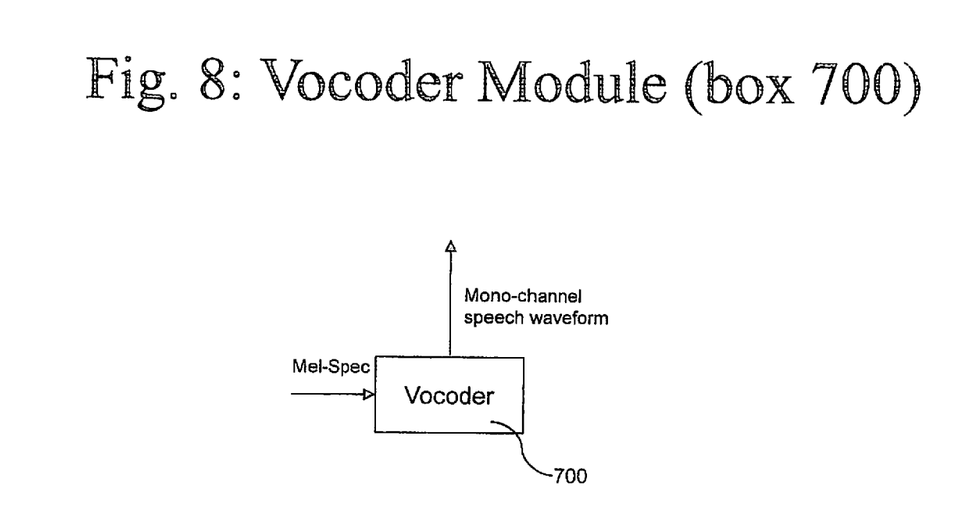
FIG. 8 shows the details of the Vocoder Module as that illustrated in module 700 of FIG. 3.

The input of the vocoder module 700 as that shown in FIG. 8 is the mel-spectrograms from module 600, while the output of the vocoder is the mono-channel speech waveforms to be passed to module 800 as an input for personal stereo speech signal generation.

In one embodiment, the module 700 is realized using deep neural networks, such as WaveNet MoL (Mixture of Logistic distribution). The WaveNet vocoder uses multiple dilated convolution layers to expand the receptive field (context), and MoL is used to predict discrete values.

In another embodiment, the module 700 is implemented using Griffin-Lim algorithm, where the phase information is iteratively approximated.

In yet another embodiment, the speech waveforms are realized using variational auto-encoder (VAE) where speaker dependent information (e.g., embedding, F0, etc.) and speaker-independent information (e.g., PDL) are modeled jointly. As a result, modules 500, 600, and 700 need to be adapted accordingly.

In one embodiment, the input to vocoder module 700 can also be spectral envelopes or mel-cepstral coefficients of the speech frames together with F0, VUV, and AP (aperiodicity). These features can be obtained by feature extraction and adaptation from the processed speech.

Figure 9:
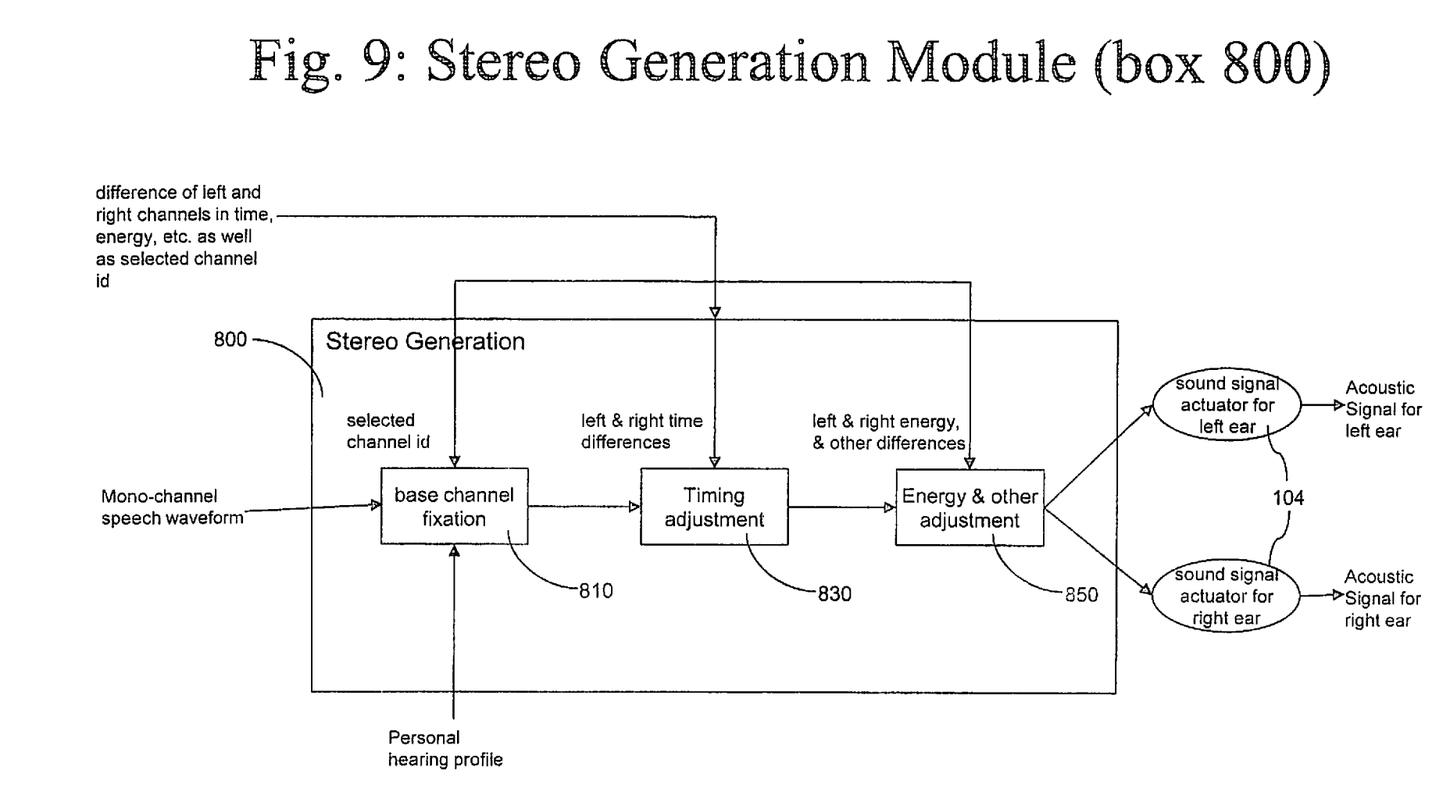
FIG. 9 is a diagram for showing the details of the Stereo Generation Module in module 800 as that illustrated in FIG. 3.

The input of the stereo generation module 800 in FIG. 9 is mono-channel speech waveforms from module 700 and the difference of left and right microphone arrays in time, energy, etc. as well as selected channel id from module 200, while the output of the module (module 800) is the stereo-channel speech waveforms which are sent to the sound actuators or speakers (module 104) in the left and right earbuds, respectively.

In one embodiment, the module 800 is realized by first setting up the base channel speech signals using the selected channel id and adjusting the mono-channel speech signal with the personal hearing profile in module 810. Additional modules in module 800 are included to adjust the timing difference to form an initial left and right stereo speech using the base mono-speech waveforms (module 830), as well as the energy and other differences on the initial stereo speech waveforms (module 850). The resulting personal stereo speech waveforms are sent to the left and right sound actuators or speakers (module 104) to generate personalized acoustic waves for better hearing of the two ears.

The personal hearing profile collected in a separate process, including frequency responses in different frequency bins. In one embodiment, adjusting the frequency responses in different frequency bins is realized using the multiple band compression technology in module 810. Alternatively, this step can be realized right before the vocoder module 700, and the resulting output becomes the input to the vocoder.

A predefined set of emergency sounds, like siren, will pass to the sound speakers without being blocked for safety reasons. In case of the dominant sound being music or singing, one may repeat the same process as speech. A certain level of reduced acoustic background can also be integrated into the stereo sound to make a more realistic perception of the speech conversation.

In a typical restaurant setting, ambient noise comes from loud talking or whispers of many dinners. When a speaker talks to another person there, he may speak in a louder voice than the background noises due to the Lombard effect. The left and right earbuds with the hearing system of the listener receive the speech with the background noises. The microphone arrays in the earbuds pass the received multiple stream signals to the noisy signal processing module(s) in the earbuds or the computing hub. The noisy signal processing module uses a beamforming algorithm to suppress the signals outside the targeted direction within a predefined spatial angle so that the signal to noise ratio of the target speech significantly increases, for example, by 10 dB. Higher SNR (signal to noise ratio) increase is possible, but the distortion also increases for human hearing. The speech signal with increased SNR is passed to an automatic speech recognizer (ASR) that is trained with such speech data processed by the same noisy signal processing module, and its performance is stable. The noisy signal processing module also extracts the timing difference info from the left and right speech streams for an integration into stereo speech signal at a later stage module. The output from the ASR module is a speaker independent (SI) probabilistic linguistic representation.

The synthesis-based hearing enhancement system may operate in different modes. In one embodiment, the direction of the target speaker or sound source is fixed with adjustable angle widths. In this case, the user of this earbud device can move his or her heads towards the speaking partner or intended sound sources. This mode is called the mode of fixed target direction.

In another embodiment, one may focus on the dominant sound sources from any direction within a certain perceptive field. The microphone array beamforming tech identifies the direction of arrival (DOA), and further enhances the dominant signal while reducing the background sounds in other directions. This mode is called the omni-direction mode. In the omni-mode, a dominance continuation period is set up so that the DOA does not switch frequently.

In terms of the attended acoustic content, the device designer may have speech-only mode, music-only mode, or speech+music mode, among others. In music related modes, one may introduce music sensitive features, such as chromagram, into the linguistic representation to better capture the details in the music.

In the system design, a set of emergency sounds need to be treated as critical signals and passed to the user of the device. Such emergency sounds may include car horns, sirens, and person screaming, and are defined by the system designers.

The default mode should incorporate emergency sounds to bypass the noise cancellation and modules and be sent to the wearers of the earbuds when the energy of the emergency sounds passes a predefined threshold.

The noise reduction system may also be applied to process speech or video recordings with stereo or even mono channels. Similar to the issues discussed above, after an initial noise reduction with known and unknown noise modeling is applied to the noise contaminated speech data, the resulting noise-reduced speech data can be distorted. The above described process can be applied to recover the speech from the speaker to the high quality recorded by close talk microphones: through converting to the PDL representation, and mapping back to a clean speech with the same voice characteristics of the original speaker. The modeling of the high quality speech of a particular speaker can use the portion of high SNR speech data in the recordings together with additional speech of highly similar voices to the speaker from any sources, and the modeling of the noise data may also go through the same procedure.

In another embodiment, the noise reduction system may be applied to process music recordings using the same approach described above.

Although the present invention has been described in terms of the presently preferred embodiment, it is to be understood that such disclosure is not to be interpreted as limiting. For example, though the conductivity types in the examples above often show an n-channel device, the invention can also be applied to p-channel devices by reversing the polarities of the conductivity types. Various alterations and modifications will no doubt become apparent to those skilled in the art after reading the above disclosure. Accordingly, it is intended that the appended claims be interpreted as covering all alterations and modifications as fall within the true spirit and scope of the invention.

Although the present invention has been described in terms of the presently preferred embodiment, it is to be understood that such disclosure is not to be interpreted as limiting. For example, though the conductivity types in the examples above often show an n-channel device, the invention can also be applied to p-channel devices by reversing the polarities of the conductivity types. Various alterations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A synthesis-based hearing aid system comprising:
   left and right microphone arrays for receiving acoustic signals;
   a module to extract timing, energy difference and channel id from the left and right microphone arrays;
   a noisy signal processing module for receiving and processing the acoustic signals transmitted from the left and right microphone arrays for generating denoised speech signals with an echo removal module;
   a human sound recognition module for receiving the denoised signals to generate a per-frame probabilistic representation of human sounds without a language model;
   a speaker identity extraction module also receiving and processing multiple frames of the denoised speech signals to generate speaker identity info with a model built from a plurality of speakers and of different SNR;
   a module for receiving and processing the recognized per-frame probabilistic representation of human sound, the speaker identity signals, and personal hearing profile to generate mono-channel human sound waveform; and
   a personal stereo generation module for receiving base mono-channel human sound waveform, timing & energy difference information and channel id for generating final personalizing stereo speech signals with a controllable background sound level setting and no noticeable differences from the target speaker.

2. The synthesis-based hearing aid system of claim 1 wherein:
   the human sound recognition module with input from the denoised speech signals and applying a speaker-independent (SI) decoder to generate a probabilistic distribution of linguistic representation (PDL).

3. The synthesis-based hearing aid system of claim 2 wherein:
   the human sound recognition module is implemented by multiple stage approaches including a feature extractor and a PDL decoder by applying an acoustic model, lexicon, and a language model for generating a PDL representation.

4. The synthesis-based hearing aid system of claim 2 wherein:
   the human sound recognition module is implemented by an end-to-end approach for taking the denoised speech and for generating the PDL representation.

5. The synthesis-based hearing aid system of claim 1 wherein:
   the denoised speech signals are sent to a speaker identity extractor and the extractor uses a trained model to produce speaker embedding.

6. The synthesis-based hearing aid system of claim 5 wherein:
   the speaker embedding paired with the PDL is sent to a Mel-spectrogram converter for applying a Mel-spec model for generating mel-spectrogram by applying a vocoder module to obtain mono-channel speech waveforms.

7. The synthesis-based hearing aid system of claim 6 wherein:
   the waveforms generated from the vocoder module are sent to a Personal stereo generation for applying a dataset comprising personal profile, timing and energy to produce digital personal stereo speech signals for transmitting to sound actuators.

8. The synthesis-based hearing aid system of claim 7 wherein:
   the sound actuators process and generate balancing speakers that generate acoustic waves for an earbud wearer.

9. The synthesis-based hearing aid system of claim 1 wherein:
   non-speech biometric signals are detected and connected to the speaker embedding.

10. The synthesis-based hearing aid system of claim 1 wherein:
    non-speech signals including music are recognized into features and integrated in the PDL representation and generated into clear stereo signals of recognized content.

* * * * *